United States Patent
Yang et al.

(10) Patent No.: US 7,046,329 B2
(45) Date of Patent: May 16, 2006

(54) OPTICAL COMPENSATED BEND NEMATIC LIQUID CRYSTAL DISPLAY PANEL

(75) Inventors: Kei-Hsiung Yang, Taoyuan (TW);
Chien-Huang Liao, Hsinchu (TW);
Hao-Ming Chang, Hsinchu (TW);
Yen-Ting Chen, Taipei (TW)

(73) Assignee: HannStar Display Corporation, Taipei (TW)

( * ) Notice: Subject to any disclaimer, the term of this patent is extended or adjusted under 35 U.S.C. 154(b) by 99 days.

(21) Appl. No.: 10/673,016

(22) Filed: Sep. 25, 2003

(65) Prior Publication Data
US 2004/0169811 A1   Sep. 2, 2004

(30) Foreign Application Priority Data
Feb. 27, 2003   (TW) .............................. 92104328 A

(51) Int. Cl.
*G02F 1/13*   (2006.01)
*G02F 1/1339*   (2006.01)

(52) U.S. Cl. .......................... 349/187; 349/156
(58) Field of Classification Search ........ 349/123–126, 349/128, 88–90, 187–191, 155–156
See application file for complete search history.

(56) References Cited

U.S. PATENT DOCUMENTS

| | | | | |
|---|---|---|---|---|
| 6,014,194 A | * | 1/2000 | Kuo et al. | 349/88 |
| 6,034,756 A | * | 3/2000 | Yuan et al. | 349/119 |
| 2003/0193637 A1 | * | 10/2003 | Mi et al. | 349/123 |

* cited by examiner

Primary Examiner—Dung T. Nguyen

(57) ABSTRACT

A method for manufacturing an optical compensated bend nematic liquid crystal display panel and a structure thereof are described. A surface of a first glass substrate having a plurality of first spacers disposed thereon, wherein a first alignment layer is formed on the surface of the first glass substrate, is provided first in this method. Then, a mixture consisting essentially of a plurality of liquid crystal molecules and a plurality of monomers with long side chains, of which carbon number is over 7, is coated on the surface of the first glass substrate. Thereafter, the mixture is cured by UV irradiation and the monomers are transferred into polymers to form an isolation layer on top of the mixture. After a second glass substrate having a plurality of second spacers disposed thereon and a second alignment layer formed thereon is provided, the first glass substrate and the second glass substrate are aligned and assembled.

19 Claims, 6 Drawing Sheets

OPTICAL COMPENSATED BEND NEMATIC LIQUID CRYSTAL DISPLAY PANEL

BACKGROUND OF THE INVENTION

1. Field of Invention

The present invention relates to a method for manufacturing a liquid crystal display panel and a structure thereof. More particularly, the present invention relates to a method for manufacturing an optical compensated bend nematic liquid crystal display panel and a structure thereof.

2. Description of Related Art

Liquid crystal display (LCD) has so many advantages, including high picture quality, small volume, light weight, low driving voltage and low power consumption, that LCDs are widely applied in electronic products such as medium or small-sized portable televisions, mobile phones, videos, notebooks, monitors for desktop computers and projection-type televisions. Therefore, as time goes by, LCDs gradually replace present cathode ray tube (CRT) monitors.

For competing with the CRT monitors, LCDs are nowadays developed towards wide viewing angle and quick response speed. The presently developed LCDs with this trend include TN+film, multi-domain vertical alignment (MVA), in-plane switch (IPS) and optically compensated bend (OCB) LCDs. As far as TN+film, multi-domain vertical alignment (MVA) and in-plane switch (IPS) LCDs are concerned, these LCDs all have the feature of wide viewing angle and can be normally manufactured. However, all these LCDs suffer from the problem of slow response speed. In contrast, as far as optically compensated bend (OCB) LCDs are concerned, it is deemed the main stream of future LCDs because which possesses both the advantages of wide viewing angle and quick response speed.

Reference is made to FIGS. 1A–1C, which are schematic, cross-sectional views of a conventional optically compensated bend (OCB) LCD illustrating how a conventional optically compensated bend (OCB) LCD work. In the conventional optically compensated bend (OCB) LCD, plural liquid crystal molecules 13 are disposed in a space between the thin film transistor array substrate 11 and the opposite substrate 12. There are two alignment layers (not shown on FIGS. 1A–1C) respectively formed on the opposite surfaces of the thin film transistor array substrate 11 and the opposite substrate 12 so that, for the liquid crystal molecules 131 and 132, there is a pre-tilt angle between the liquid crystal molecules 131 and 132 and the adjacent substrates 11 and 12. As shown in FIG. 1A, before the optically compensated bend (OCB) LCD works, the arrangements of the liquid crystal molecules 13 are in a splay state. Only after the arrangements of the liquid crystal molecules 13 are converted from the splay state to a bend state (as shown in FIG. 1B), the optically compensated bend (OCB) LCD can just be ready to work. That is, before the conventional optically compensated bend (OCB) LCD is ready to work, it takes time to warm up to convert the arrangements of the liquid crystal molecules 13 from the splay state to the bend state. Thereafter, as shown in FIG. 1C, by applying voltages on the thin film transistor array substrate 11 and the opposite substrate 12 to produce an electrical field therebetween, the liquid crystal molecules 13 starts to rotate to make the conventional optically compensated bend (OCB) LCD work.

Although the conventional optically compensated bend (OCB) LCD possesses both the advantages of wide viewing angle and quick response speed, it takes a lot of time, e.g. from several seconds to several minutes, to warm up LCD. Besides, the liquid crystal molecules in bend state are not thoroughly stable, the arrangements of the liquid crystal molecules are still easily affected by external causes, such as electrical field or temperature. Accordingly, there is a need for the conventional optically compensated bend (OCB) LCD to be improved.

SUMMARY OF THE INVENTION

For the forgoing reasons, it is therefore an objective of the present invention to provide an optical compensated bend nematic liquid crystal display panel and a structure thereof, wherein the warm-up procedure thereof is omitted.

In one aspect, a method for manufacturing an optical compensated bend nematic liquid crystal display panel is described. First, a surface of a first glass substrate having a plurality of first spacers disposed thereon, wherein a first alignment layer is formed on the surface of the first glass substrate, is provided. Then, a mixture consisting essentially of a plurality of liquid crystal molecules and a plurality of monomers with long side chains, of which carbon number is over 7, is coated on the surface of the first glass substrate. Thereafter, the mixture is cured by UV irradiation and the monomers are transferred into polymers to form an isolation layer on top of the mixture. Next, a surface of a second glass substrate having a plurality of second spacers disposed thereon, wherein a second alignment layer is formed on the surface of the second glass substrate, is provided. Finally, the first glass substrate and the second glass substrate are aligned and assembled.

In another aspect, a structure of an optical compensated bend nematic liquid crystal display panel is described. The optical compensated bend nematic liquid crystal display panel includes a thin film transistor array substrate, an opposite substrate corresponding to the thin film transistor array substrate, and an isolation layer disposed between the thin film transistor array substrate and the opposite substrate. A first alignment layer is formed on a surface of the thin film transistor array substrate and a plurality of first spacers are disposed on the surface of the thin film transistor array substrate. A second alignment layer is formed on a surface of the opposite substrate and a plurality of second spacers are disposed on the surface of the opposite substrate. The isolation layer is made of a plurality of polymers with side chains of high carbon number It is to be understood that both the foregoing general description and the following detailed description are examples only, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
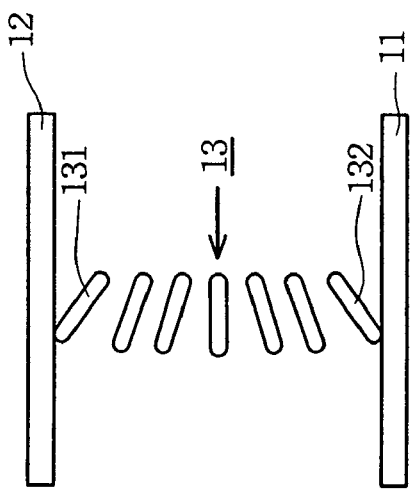
FIGS. 1A–1C are schematic, cross-sectional views of a conventional optically compensated bend (OCB) LCD illustrating how a conventional optically compensated bend (OCB) LCD work.
Figure 1B:
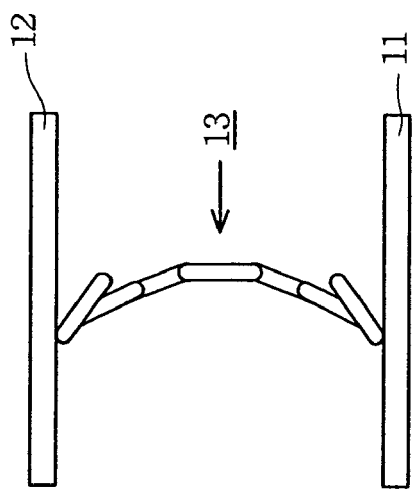
Figure 1C:
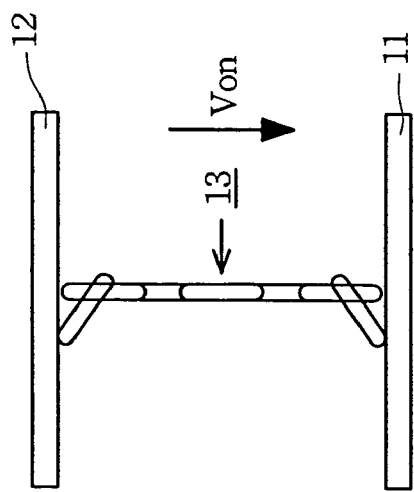

Reference will now be made in detail to the present preferred embodiments of the invention, examples of which are illustrated in the accompanying drawings. Wherever possible, the same reference numbers are used in the drawings and the description to refer to the same or like parts.

Figure 2A:
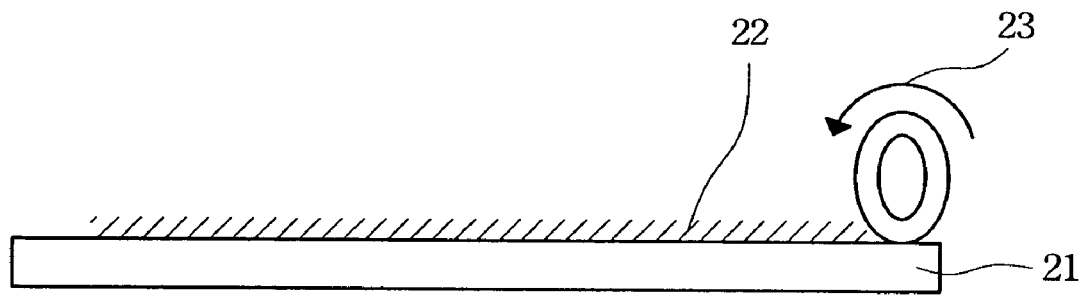
FIGS. 2A–2G are schematic, cross-sectional views illustrating manufacturing for an optically compensated bend nematic liquid crystal display in accordance with the present invention.

Reference are made to FIGS. 2A–2G, which are schematic, cross-sectional views illustrating manufacturing for an optically compensated bend nematic liquid crystal display in accordance with the present invention. First, as shown in FIG. 2A, a first glass substrate 21 is provided. A first alignment layer 22 is formed on a surface of the first glass substrate 21 in advance. For example, the first alignment layer 22 can be formed by means of rubbing 23 a polyimide film coated on the surface of the first glass substrate 21.

Figure 2B:

In FIG. 2B, a mixture 24 consisting essentially of plural liquid crystal molecules, plural first monomers and plural second monomers on the surface of the first glass substrate 21, wherein a carbon number of side chains of the second monomers is over 7. The mixture 24 can be coated on the surface of the first glass substrate 21 by means of printing.

Figure 2C:
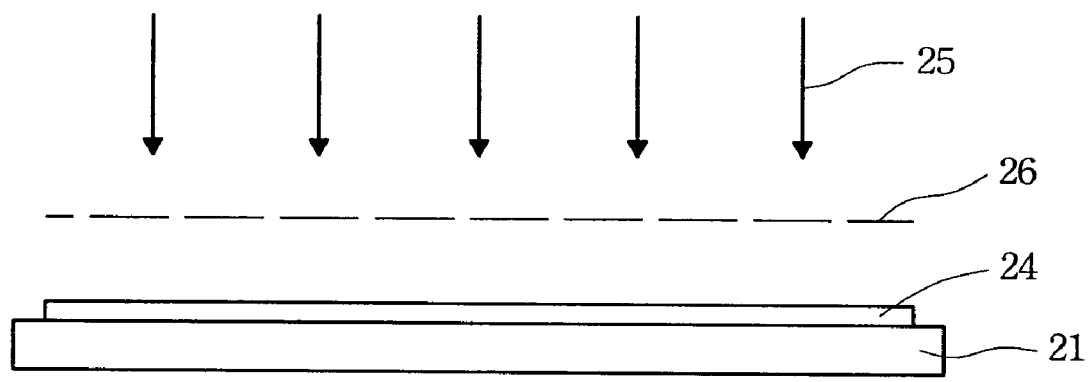
Figure 2D:
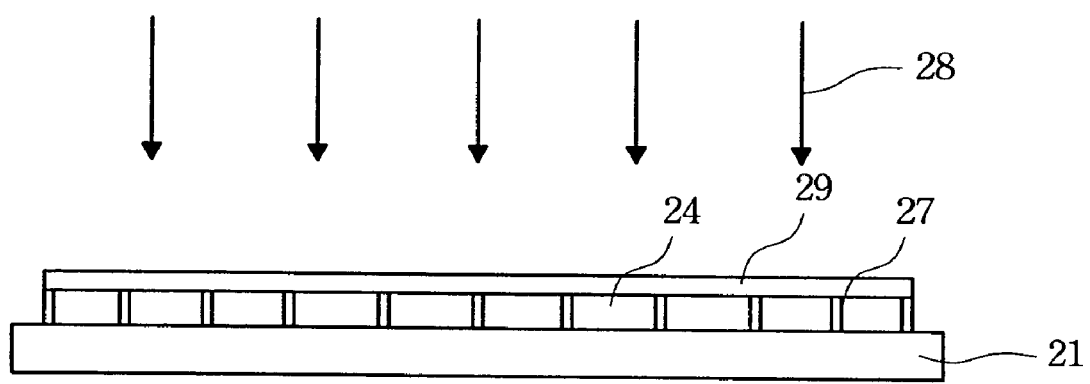

In FIG. 2C, the first glass substrate 21 is irradiated with a first UV 25 through a mask 26 to polymerize the first monomers inside the mixture 24 for forming plural first spacers 27 (as shown in FIG. 2D) on the surface of the first glass substrate 21.

In FIG. 2D, the first glass substrate 21 is irradiated with a second UV 28 to polymerize the second monomers inside the mixture 24 for forming an isolation layer 29 on top of the mixture 24. Preferably, a thickness of the isolation layer 29 is arranged from 0.1 to 10 micrometers. After the first monomers and the second monomers inside the mixture 24 are both polymerized by being respectively irradiated with first UV 25 and second UV 28, the mixture 24 remains only the liquid crystal molecules. In fact, the mixture 24 further includes first initiator for initiating polymerization of the first monomers when the first glass substrate 21 is irradiated with first UV 25, and second initiator for initiating polymerization of the second monomers when the first glass substrate 21 is irradiated with second UV 28.

Figure 2E:
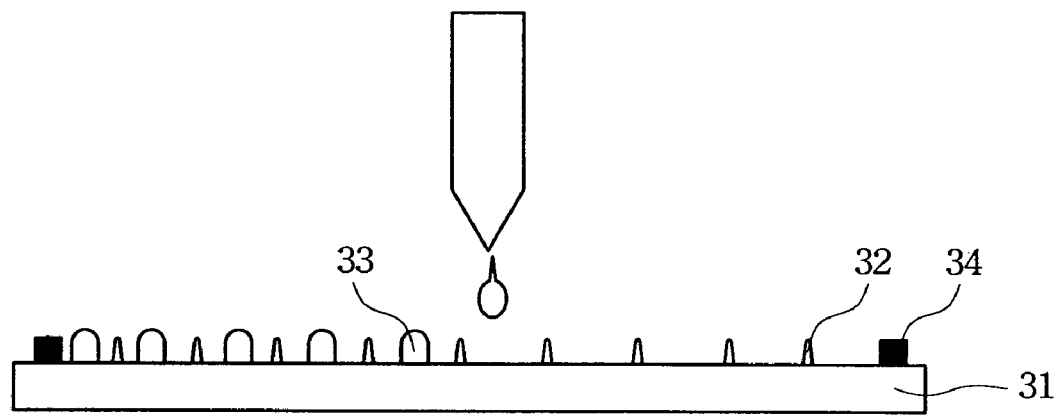

In FIG. 2E, a second glass substrate 31 is provided first. Then, a plural second spacers 32 such as photo spacers are formed on a surface of the second glass substrate 31. Next, a second alignment layer (not shown in FIG. 2E) is formed on the surface of the second glass substrate 31. Thereafter, the liquid crystal molecules are filled into the spaces between adjacent second spacers 32 by means of one drop fill method. Then, a periphery of the surface of the second glass substrate 31 is coated with a sealing adhesive 24.

Figure 2F:
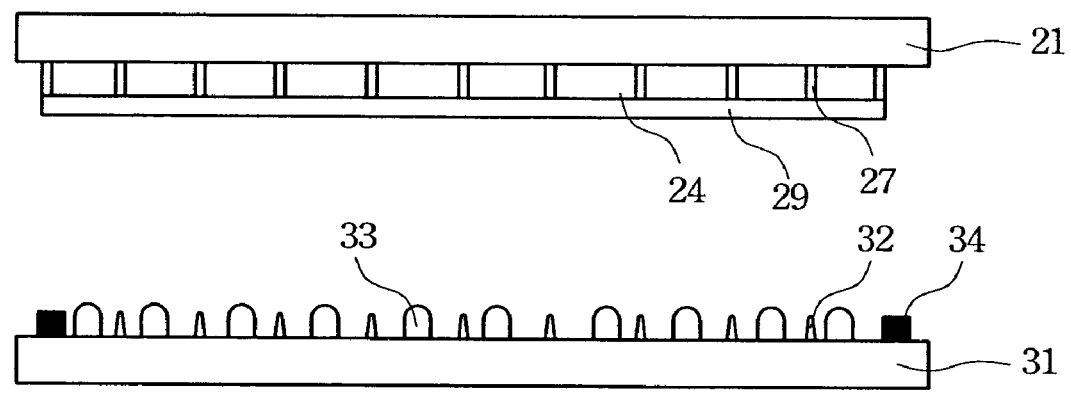
Figure 2G:
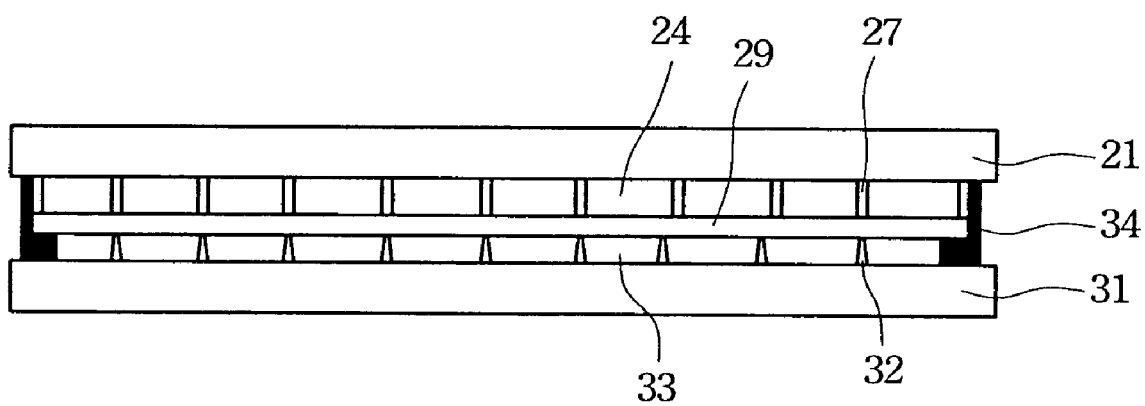

Finally, as shown in FIG. 2F, the surface of the first glass substrate 21 and the surface of the second glass substrate 31 are aligned and assembled. The sealing adhesive 24 is also cured. The manufactured optically compensated bend nematic liquid crystal display in accordance with the present invention is shown in FIG. 2G.

Figure 3:
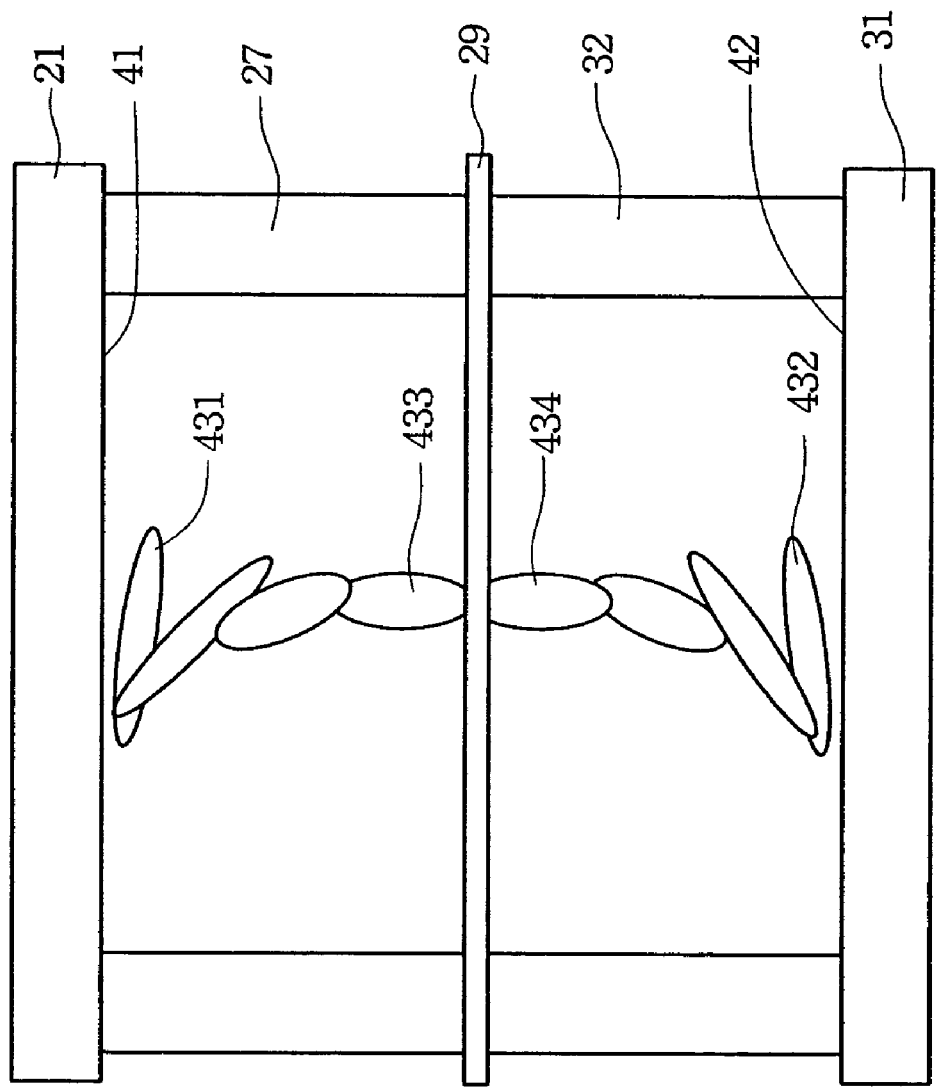
FIG. 3 is a schematic, partial cross-sectional view illustrating a structure of an optically compensated bend nematic liquid crystal display in accordance with the present invention.

Please refer to FIG. 3, which is a schematic, partial cross-sectional view illustrating a structure of an optically compensated bend nematic liquid crystal display in accordance with the present invention. Because the isolation layer 29 is formed by polymerizing the second monomers of long side chains, e.g. a carbon number thereof is over 7, the liquid crystal molecules 433, 434 adjacent to the isolation layer 29 is maintained vertically with respect to the isolation layer 29. Certainly, the liquid crystal molecule 431 adjacent to the first alignment layer 41 and the liquid crystal molecule 432 adjacent to the second alignment layer 42 are maintained to arrange oppositely to each other. In other words, the liquid crystal molecules encompassed inside the optically compensated bend nematic liquid crystal display are originally maintained in a bend state. Compared with the convention optically compensated bend (OCB) LCD, the optically compensated bend nematic liquid crystal display in accordance with the present invention does not have to additionally include a warm-up step to convert the arrangements of the liquid crystal molecules from the splay state to the bend state.

According to the present invention, the first spacers 27 and the second spacers 32 can be formed by means of other methods in addition to the above-mentioned steps. For example, the first spacers 27 and the second spacers 32 can both be photo spacers. That is, the first spacers 27 and the second spacers 32 can be formed on the first glass substrate 21 and the second glass substrate 31 by means of photolithography and etching technique in advance. In this case, the mixture 24 coated on the first glass substrate 21 does not include the first monomers for forming the first spacers 27. The mixture 24 merely consists of the liquid crystal molecules and the second monomers for forming the isolation layer. The step of FIG. 2C is omitted as well.

According to the present invention, the first spacers and the isolation layer can be formed on a thin film transistor array substrate, and then the thin film transistor array substrate is aligned and assembled with an opposite substrate. Alternatively, the first spacers and the isolation layer can be formed on an opposite substrate first, and then the opposite substrate is aligned and assembled with a thin film transistor array substrate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing an optical compensated bend nematic liquid crystal display panel, said method comprising:

providing a first glass substrate, wherein a first alignment layer is formed on a surface of said first glass substrate;

coating a mixture consisting essentially of a plurality of liquid crystal molecules and a plurality of monomers on said surface of said first glass substrate;

irradiating said first glass substrate, and a plurality of first spacers formed in the mixture by a previous irradiation, with UV to polymerize said monomers for forming an isolation layer on top of said mixture;

providing a second glass substrate, wherein a second alignment layer is formed on a surface of said second glass substrate and a plurality of second spacers are disposed on said surface of said second glass substrate, said liquid crystal molecules being disposed between adjacent second spacers; and aligning and assembling said surface of said first glass substrate and said surface of said second glass substrate.

2. The method according to claim 1, wherein said first spacers and said second spacers are photo spacers.

3. The method according to claim 1, wherein said first glass substrate is a thin film transistor array substrate and said second glass substrate is an opposite substrate.

4. The method according to claim 1, wherein said first glass substrate is an opposite substrate and said second glass substrate is a thin film transistor array substrate.

5. The method according to claim 1, wherein said mixture further includes an initiator for initiating a polymerization of said monomers when said first glass substrate is irradiated with said UV.

6. The method according to claim 1, wherein after aligning and assembling said surface of said first glass substrate and said surface of said second substrate, said method further comprises curing a sealing adhesive coated on a periphery of said surface of said second glass substrate.

7. The method according to claim 1, wherein said liquid crystal molecule adjacent to said first alignment layer and said liquid crystal molecule adjacent to said second alignment layer are arranged oppositely to each other.

8. The method according to claim 1, wherein a thickness of said isolation layer is arranged from 0.1 to 10 micrometers.

9. The method according to claim 1, wherein a carbon number of side chains of said monomers is over 7.

10. A method for forming an optical compensated bend nematic liquid crystal display panel, said method comprising:
   providing a first glass substrate, wherein a first alignment layer is formed on a surface of said first glass substrate;
   coating a mixture consisting essentially of a plurality of liquid crystal molecules, a plurality of first monomers and a plurality of second monomers on said surface of said first glass substrate;
   irradiating said first glass substrate with a first UV to polymerize said first monomers for forming a plurality of first spacers on said surface of said first glass substrate;
   irradiating said first glass substrate with a second UV to polymerize said second monomers for forming an isolation layer on top of said mixture;
   providing a second glass substrate, wherein a second alignment layer is formed on a surface of said second glass substrate and a plurality of second spacers are disposed on said surface of said second glass substrate, said liquid crystal molecules being disposed between adjacent second spacers; and
   aligning and assembling said surface of said first glass substrate and said surface of said second glass substrate.

11. The method according to claim 10, wherein said second spacers are photo spacers.

12. The method according to claim 10, wherein said first glass substrate is a thin film transistor array substrate and said second glass substrate is an opposite substrate.

13. The method according to claim 10, wherein said first glass substrate is an opposite substrate and said second glass substrate is a thin film transistor array substrate.

14. The method according to claim 10, wherein said mixture further includes a first initiator for initiating a polymerization of said first monomers when said first glass substrate is irradiated with said first UV.

15. The method according to claim 10, wherein said mixture further includes a second initiator for initiating a polymerization of said second monomers when said first glass substrate is irradiated with said second UV.

16. The method according to claim 10, wherein after aligning and assembling said surface of said first glass substrate and said surface of said second substrate, said method further comprises curing a sealing adhesive coated on a periphery of said surface of said second glass substrate.

17. The method according to claim 10, wherein said liquid crystal molecule adjacent to said first alignment layer and said liquid crystal molecule adjacent to said second alignment layer are arranged oppositely to each other.

18. The method according to claim 10, wherein a thickness of said isolation layer is arranged from 0.1 to 10 micrometers.

19. The method according to claim 10, wherein a carbon number of side chains of said second monomers is over 7.

* * * * *